Sept. 22, 1936.　　　　C. GOTTFRIED　　　　2,055,101
BAKING OVEN
Filed March 14, 1935　　　3 Sheets-Sheet 2
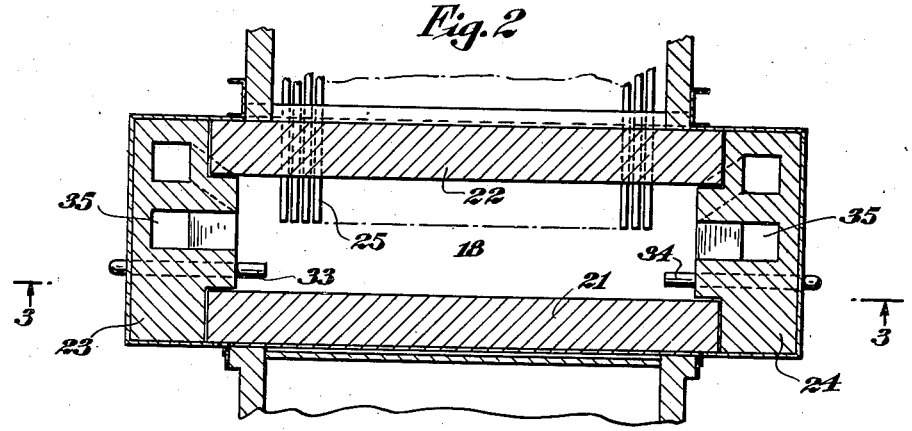
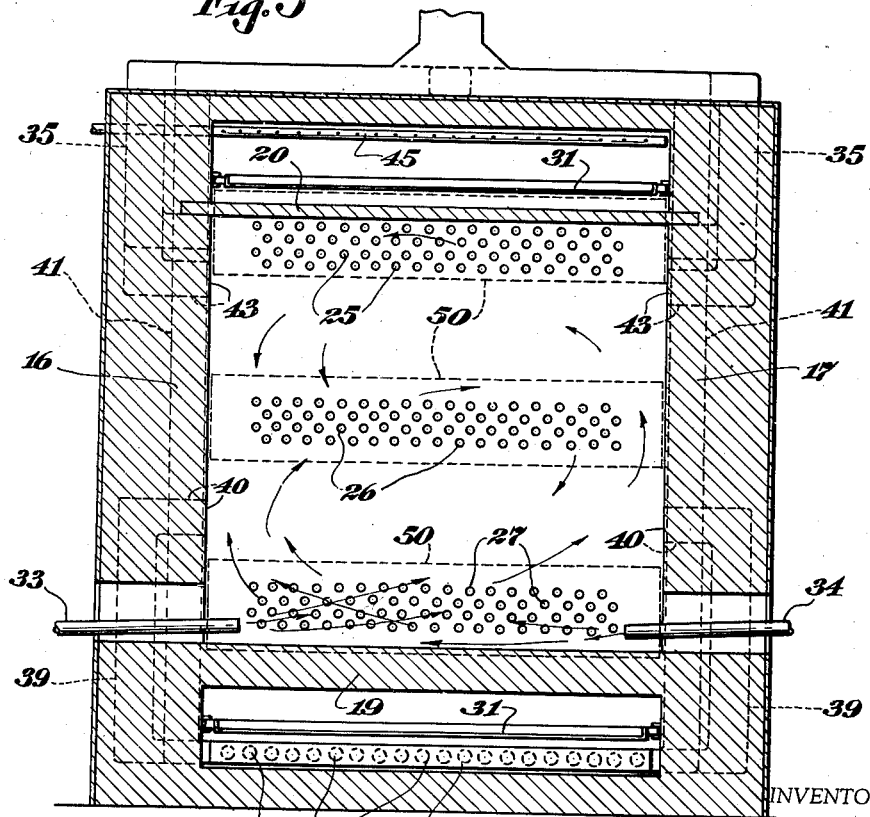
INVENTOR.
Charles Gottfried,
BY Frederick Breitenfeld
ATTORNEY.

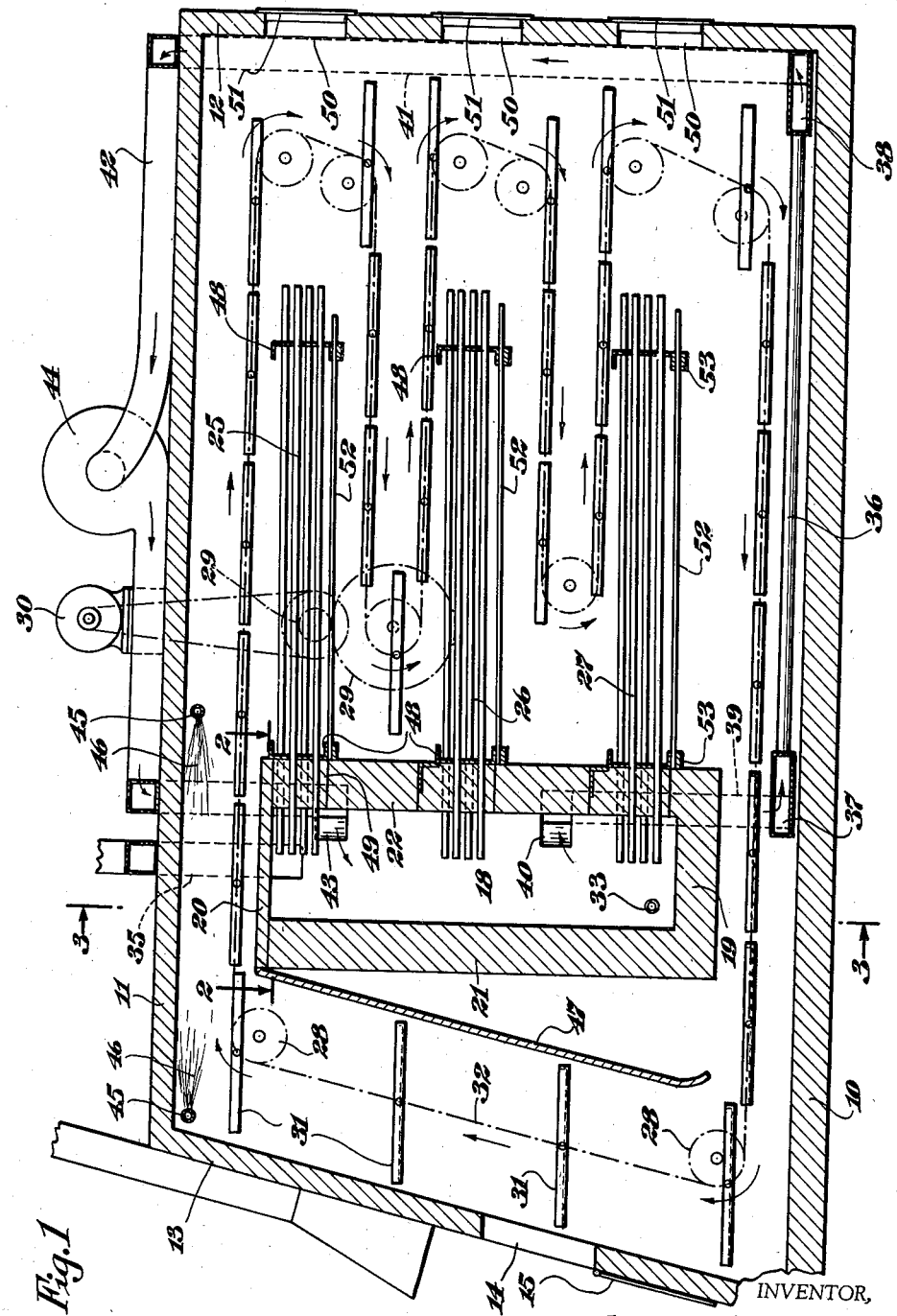

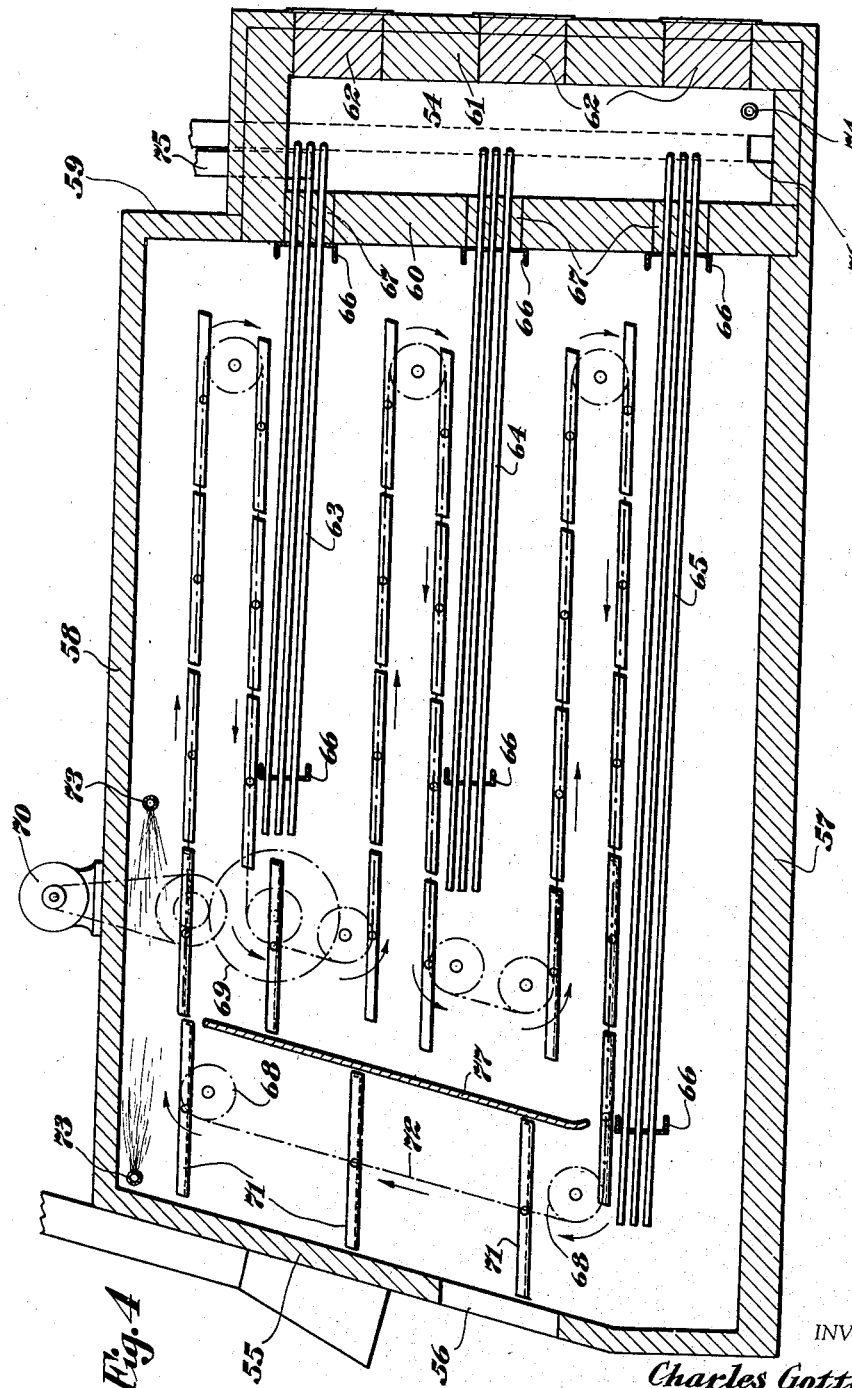

Patented Sept. 22, 1936

2,055,101

UNITED STATES PATENT OFFICE 2,055,101

BAKING OVEN

Charles Gottfried, New York, N. Y.

Application March 14, 1935, Serial No. 10,972

10 Claims. (Cl. 107—57)

My present invention relates generally to baking machinery, and has particular reference to an improved baking oven.

The type of oven toward which my invention is directed involves an endless conveyor means for advancing a plurality of hearth plates in continuous procession through a baking chamber and past a feeding aperture. The advancement is usually and preferably intermittent, so that successive plates pause momentarily at the feeding aperture to permit an operator to remove a batch of articles that have been baked, and to apply a fresh batch of dough or the like.

It is a general object of my invention to provide an oven of improved and simplified design, permitting a greater number of hearth plates to be employed within a minimum amount of space. By means of my invention I am also enabled to employ steam tubes for heating the oven, the tubes being completely straight and unbent and being mounted and arranged in such a manner that they are individually accessible without requiring complete dismantlement of the oven. In accordance with my invention, the tubes are individually adjustable in an axial direction with respect to the fire box from which they project; and the accessibility to the tubes permits adjustments of this character to be carried out with relative ease, and also permits tubes to be periodically examined and, if necessary, repaired or replaced.

In certain baking procedures, the introduction of steam into the baking chamber itself is desirable, and it is a particular feature of my invention to provide an arrangement which permits this steam introduction to be accomplished without the usual costly escape of the steam into the outside atmosphere. Whether steam is used or not, my present construction is of a special character which minimizes the escape of heat from the oven out of the feeding aperture, and the corresponding losses which occur by air infiltration.

One of the characterizing features of my invention lies in the arrangement of a substantially rectangular chamber in combination with a fire box which extends transversely across the chamber, either within the confines of the chamber or at one end of the latter. In either event, the steam tubes which serve to heat the baking compartment project longitudinally into the chamber along perfectly straight lines, and the tubes are arranged in superposed tiers. The endless conveyor means advances the hearth plates sinuously downwardly through the chamber along successively lower horizontal planes of travel, and the several groups of steam tubes project into the spaces between successives laps of said sinuous path of travel.

My present construction is further characterized by an introduction of the hearth plates into the top of the chamber first; and a means for furnishing sufficient bottom heat to maintain the trays at the required high temperature as they approach the feeding aperture at the end of the baking procedure.

I achieve the foregoing objects, and such other objects as may hereinafter appear or be pointed out, in the manner illustratively exemplified in the accompanying drawings, wherein—

Figure 1 is a longitudinal, cross-sectional view through an oven constructed in accordance with the present invention, this view being in many respects diagrammatic;

Figure 2 is an enlarged, cross-sectional view taken substantially along the line 2—2 of Figure 1;

Figure 3 is a vertical, transverse, cross-sectional view taken substantially along the lines 3—3 of Figures 1 and 2; and Figure 4 is a view similar to Figure 1, illustrating a modification.

In the drawings, except where features of novelty require, structural supporting elements, such as beams, columns, etc., are omitted for the sake of clearness. It will be understood, however, by those skilled in the art that the oven requires a supporting structure formed of suitable angle irons, brackets, and the like. The drawings also omit the details of construction of the endless conveyor means, since this forms no part of the present invention except in so far as the relationship of hearth plate travel to the rest of the structure is concerned.

Referring to Figures 1, 2, and 3, the oven consists of a substantially rectangular chamber wherein 10 represents the bottom wall or floor, 11 represents the top wall, and 12 and 13 represent the opposite end walls. The end wall 13 is preferably inclined upwardly and is provided with a feeding or loading aperture 14 which may or may not be provided with a closure 15. The side walls are shown most clearly in Figure 3 and are designated by the reference numerals 16 and 17.

Arranged transversely across the chamber is a substantially rectangular fire box 18. It has a bottom wall 19, a top wall 20, end walls 21 and 22, and side walls 23 and 24. In the embodiment of Figures 1–3, the fire box is arranged within the confines of the main chamber near the end wall having the feeding aperture 14. The fire box thus forms the forward wall of a rear baking compartment.

Projecting from the end wall 22 of the fire box into the baking compartment are groups of straight steam tubes arranged in superposed tiers. The uppermost group is designated by the reference numeral 25, and the successively lower groups 26 and 27 are clearly indicated in Figure 1. More than three tiers may, if desired, be provided, and in some instances only two tiers may be used. Each of the tubes is of the well known character which is sealed at both ends and which, when initially manufactured, contains a quantity of water. When one end of the steam tube is mounted within a fire box, and is thus subjected to a high temperature, the water turns to steam which fills the entire tube. The steam is obviously at a high pressure and, consequently, at a high temperature, as a result of which the body of the tube radiates heat in a highly desirable, continuous manner for baking purposes.

The endless conveyor means involves guide rollers which are designated by the reference numerals 28, and one of them is caused to be driven by a train of gears 29 deriving its power from a driving motor 30. The details of the driving mechanism have not been shown, but it will be understood that any suitable arrangement may be employed to permit the drive to be connected and disconnected at will, to permit the speed of the drive to be varied, and to cause the conveyor means to operate in a predetermined, intermittent manner. Articulated to the conveyor means are the hearth plates 31. They are so spaced from one another that when they are traveling in horizontal alignment they are closely adjacent to one another. The articulation is such as to keep the hearth plates always horizontal and, therefore, during vertical movements of the plates they are spaced in superposed relationship. The path of travel is indicated by the dot-and-dash line 32. It will be observed that the hearth plates are advanced upwardly past the feeding aperture 14, thence rearwardly into the baking compartment, then sinuously downwardly through the oven along successively lower, horizontal planes of travel, and finally back along the bottom of the chamber to the starting point.

The arrangement illustrated in Figure 1 provides for three complete laps, i. e., and advancement along one horizontal plane and a return along a lower horizontal plane. In accordance with my invention, these laps are so arranged that the tiers of steam tubes 25, 26, and 27 project into the spaces between successive laps.

The upper wall 20 of the fire box is purposely spaced from the upper wall 11 of the chamber by an amount just sufficient to provide an entrance passageway for the plates, account being taken of the trays and articles that are to be rested thereon. Similarly, the bottom wall 19 of the fire box is spaced from the bottom wall 10 of the chamber by an amount just sufficient to provide an exit passageway for these plates.

The fire box is provided with opposed fuel nozzles 33 and 34 adapted to inject fuel into the fire box. In accordance with my invention, these nozzles are so arranged that the flames are projected into the fire box in transverse directions, i. e., in directions substantially perpendicular to the axes of the steam tubes. Furthermore, these nozzles are arranged in mutually offset relation, as shown most clearly in Figure 3, so as to avoid head-on impingement of the opposing flames and to produce a swirling action which distributes the heat with substantial uniformity throughout the entire fire box. Exhaust flues 35 remove the products of the combustion at or near the top of the fire box.

In order to provide an adequate amount of bottom heat, in the embodiment of Figures 1-3, an auxiliary heating unit 36 is provided in the bottom of the chamber. This unit consists of a plurality of flues or pipes communicating at the forward end in the transverse header 37 and at the rearward end in the similar header 38. The header 37 communicates, by means of the two lateral flues 39, with the openings in the fire box designated by the reference numerals 40. The header 38 communicates with two vertically extending, lateral flues 41 which merge at the top into the flue 42, the latter in turn communicating with the two openings 43 near the upper end of the fire box. In the flue 42 a blower or fan 44 is mounted, serving continuously to draw hot gases from the fire box through the openings 40, into the heating unit 36, and thence back into the fire box through the openings 43.

The unit 36 serves to heat the trays in the lowermost horizontal plane of travel, thereby maintaining the trays at the requisite high temperature as they approach the feeding apertures.

I have illustratively shown a pair of transverse steam tubes 45 in the upper portion of the chamber, adapted to inject steam along the directions 46. The introduction of such steam is desirable in the baking of certain products, for the purpose of moistening the air in the oven.

In accordance with my invention, a baffle plate or wall 47 is arranged behind the end wall 13, substantially parallel to the latter, and adapted to form with the wall 13 and the side walls of the chamber a conduit through which the plates 31 travel during their upward advancement past the feeding aperture. This conduit is relatively snug, just sufficient space being provided to permit the plates to travel in an unimpeded manner. The provision of this conduit permits the plates themselves to serve successively as seals to prevent escape of heat out of the oven. Ordinarily, outside air has a tendency to be sucked into the feeding aperture over the bottom edge thereof, and to work its way downwardly into the oven; this in turn causing the heated air in the oven to travel down the end wall 13 and out of the feeding aperture. This undesirable flow of air is minimized to the maximum degree by the arrangement of the snug conduit herein mentioned, since the plates themselves operate, just as the segments of a revolving door operate, to seal the interior of the oven from the feeding aperture.

One of the particular features of my invention lies in mounting the the steam tubes in axially adjustable relationship to the fire box. This is accomplished by supporting the steam tubes in the channel members 48, each of the latter being provided with round openings within which the steam tubes are accommodated. At the fire box each bundle of steam tubes is embedded in a mass of refractory cement 49 which, after it has set, provides openings through which the tubes may be longitudinally shifted. In other words, this cement does not bond with the tubes to hold them rigidly, but merely encircles them.

The advantage of the longitudinal adjustment lies in the fact that the amount of heat in the several tiers may be accurately adjusted. If it is found, for example, that the heat given off by the uppermost tier 25 is too great, some or all of the tubes may be adjusted axially to leave a smaller portion projecting into the fire box. Or, if more heat is found to be necessary in any other portion of the oven, the tubes may be correspondingly positioned further into the fire box.

This longitudinal adjustability is made possible because of the perfectly straight nature of the tubes. If they were curved, as is the case in most ovens of this general character, such adjustability would be utterly unfeasible.

A further advantage of this adjustability lies in the fact that one or more of the tubes may be completely removed, when desired, for purposes of inspection, repair, or replacement. To permit this to be accomplished I provide access openings 50 in the end wall 12 of the outer chamber, each access opening being substantially aligned with one of the tiers of steam tubes. Removable closures 51 are provided for the access openings.

As a further means for regulating the heat in the various portions of the oven, I prefer to provide removable baffle plates 52 under each tier of steam tubes. These plates may be supported on any suitable brackets 53, and they may be inserted or removed through the access openings 50.

In Figure 4, I have illustrated a modified construction which is fundamentally the same as that of Figure 1, but differs from the construction of Figure 1 by the arrangement of the fire box 54 at the end of the chamber opposite the feeding aperture.

In the construction of Figure 4, the substantially rectangular chamber has the end wall 55 with the feeding aperture 56, the bottom and top walls 57 and 58, and the end wall 59. The end wall 60 of the fire box forms a continuation of the end wall 59 of the chamber. The opposite end wall 61 of the fire box, disposed outwardly, is provided with access openings which are normally closed by the removable closures 62. These access openings are substantially aligned with the tiers of steam tubes 63, 64, and 65. These tubes, as before, are supported in channels 66, and pass through masses of refractory cement 67 as they enter the fire box.

The endless conveyor means includes the guide rollers 68 and the driving means 69, 70; and the path of travel of the plates 71 is indicated by the dot-and-dash lines 72. Steam inlet tubes 73 may, if desired, be mounted in the upper portion of the chamber.

The fire box is provided with the opposed fuel burners 74 and the outlet flues 75 and 76.

It will be observed that the travel of the hearth plates is substantially identical with that of Figure 1. The plates move in superposed relation upwardly past the feeding aperture 56. They then travel into the oven proper and are advanced sinuously downwardly through the chamber along successively lower horizontal planes of travel. The tiers of steam tubes, as before, project into the spaces between successive laps of the sinuous path of travel. But because of the opposite end arrangement of the fire box, at the opposite end of the baking compartment, the lowermost tier 65 may be made considerably longer than the others and serves the function of the auxiliary heating unit 36 of Figure 1. In other words, the lowermost tier of steam tubes 65 furnishes the requisite bottom heat for maintaining the plates at the desired high temperature as they travel back toward the feeding aperture.

The baffle plate or wall 77 behind the end wall 55 of the chamber serves, as before, to provide a relatively snug conduit through which the plates travel as they move upwardly past the feeding aperture. This permits the leads, as before, to function successively as seals to prevent escape of heat from the oven and to prevent infiltration of outside air.

The additional outlet flue 76 is provided in the fire box for the purpose of more evenly distributing the heat throughout the fire box. It will be observed that this flue communicates with the fire box near the bottom thereof. This prevents the heat from concentrating too much at the upper end of the fire box and imparting too much heat to the upper tier of tubes 63 and too little heat to the bottom tier 65.

The embodiment of Figure 4 is in several respects preferable to that of Figure 1. The heat within the oven is produced entirely and solely by means of steam tubes, and this is an advantage because of the desirable qualities of steam tubes in emanating a uniform amount of heat. None of the extraneous forms required by the auxiliary unit 36 of Figure 1 are necessary in the construction of Figure 4. Furthermore, the plates travel along two horizontal planes before they dip down below the uppermost tier of tubes. (In Figure 1 the plates travel along only one horizontal plane before advancing beneath the uppermost tier.) This has an advantage in the baking procedure of numerous commodities.

On the other hand, the embodiment of Figure 1 is in certain respects preferable to that of Figure 4. It is somewhat more compact, and the steam tubes are somewhat more accessible for longitudinal adjustment, removal, or the like. It should be noted, however, that the longitudinal adjustability and accessibility of the steam tubes is present in the embodiment of Figure 4, just as in Figure 1.

No mention has been made of insulation or refractory material, and it will be understood by those skilled in the art that insulating material is used for the walls wherever necessary or desirable, and, obviously, that refractory brick or similar structural material is used in connection with the fire box wherever necessary.

It will thus be observed that I have provided a multi-tier oven of the endless conveyor type which is unusually compact, simple in construction, and efficient in operation. The cost of manufacture and operation is much less than that required for multi-tier ovens of the character at present available on the market and in use. The baking capacity is increased materially, and the various features of heat retention and adjustability permit the present oven to be used to advantage in the baking of a variety of different types of articles.

It will be observed further that by virtue of the present construction I am enabled to introduce the dough into the upper portion of the oven first, without subjecting it disastrously (as would be the case with ordinary baking ovens) to excessive heat. The entrance of the dough into the top of the oven chamber is highly desirable because of the natural rise in the oven of the steamy, moist atmosphere which emanates from baking bread and which is beneficial to the fresh dough. In accordance with my present invention, this advantageous effect may be obtained without overheating the bread, because of the baffling effect of the several layers of plates constituting the multi-tier construction. Thus, the top layer of plates is shielded from excessive heat by the layer immediately beneath it, and each layer in turn is shielded by the various layers beneath it, each lap of plates absorbing its proportional amount of the heat which is rising in the oven. This prevents the undesirable "pyramiding" of the heat toward the top of the oven, which is a fatal disadvantage of all other types of traveling-plate ovens, requiring them regularly to introduce the dough into the bottom or center of the oven first.

From certain aspects, it will be understood that the employment of steam tubes to furnish the heat required for the oven is not essential; and that the heating of the oven might, for example, be accomplished by tubes within which the furnace gases are caused to circulate. Such tubes, however, whether employing furnace gases or other heating medium, would be arranged in groups and tiers, substantially as herein illustrated and described.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a baking oven, a substantially rectangular chamber with a feeding aperture in one end wall, a plurality of hearth plates, endless conveyor means for advancing said plates in continuous procession upwardly past the feeding aperture and then sinuously downwardly through said chamber along successively lower horizontal planes of travel, a fire box arranged transversely across said chamber at one end of the region of sinuous travel, and groups of straight steam tubes projecting in tiers from the fire box into the spaces between successive laps of said sinuous path of travel.

2. In a baking oven, a substantially rectangular chamber with a feeding aperture in one end wall, a plurality of hearth plates, endless conveyor means for advancing said plates in continuous procession upwardly past the feeding aperture and then sinuously downwardly through said chamber along successively lower horizontal planes of travel, a fire box arranged transversely across said chamber at one end of the region of sinuous travel, and groups of straight steam tubes projecting in tiers from the fire box into the spaces between successive laps of said sinuous path of travel; said fire box being arranged across the remote end wall of said chamber with said tubes projecting in the direction of said feeding aperture.

3. In a baking oven, a substantially rectangular chamber with a feeding aperture in one end wall, a plurality of hearth plates, endless conveyor means for advancing said plates in continuous procession upwardly past the feeding aperture and then sinuously downwardly through said chamber along successively lower horizontal planes of travel, a fire box arranged transversely across said chamber at one end of the region of sinuous travel, and groups of straight steam tubes projecting in tiers from the fire box into the spaces between successive laps of said sinuous path of travel; said fire box being arranged across the chamber near the wall having the feeding aperture, with said tubes projecting in the direction of the remote end wall.

4. In a baking oven, a substantially rectangular chamber with a feeding aperture in one end wall, a plurality of hearth plates, endless conveyor means for advancing said plates in continuous procession upwardly past the feeding aperture and then sinuously downwardly through said chamber along successively lower horizontal planes of travel, a fire box arranged transversely across said chamber at one end of the region of sinuous travel, and groups of straight steam tubes projecting in tiers from the fire box into the spaces between successive laps of said sinuous path of travel; the fire box being provided with opposed fuel nozzles adapted to project flames into the fire box in directions substantially perpendicular to the axes of said tubes.

5. In a baking oven, a substantially rectangular chamber with a feeding aperture in its front wall, a fire box arranged transversely across said chamber and forming the forward wall of a rear baking compartment, groups of straight steam tubes projecting in tiers rearwardly from the fire box into said baking compartment, a plurality of hearth plates, and endless conveyor means for advancing said plates in continuous procession upwardly past the feeding aperture and then downwardly and successively around said tiers of tubes.

6. In a baking oven, a substantially rectangular chamber with a feeding aperture in its front wall, a fire box arranged transversely across said chamber and forming the forward wall of a rear baking compartment, groups of straight steam tubes projecting in tiers rearwardly from the fire box into said baking compartment, a plurality of hearth plates, and endless conveyor means for advancing said plates in continuous procession upwardly past the feeding aperture, over the fire box, successively downwardly around said tiers of tubes, and back under the fire box.

7. In a baking oven, a substantially rectangular chamber with a feeding aperture in its front wall, a fire box arranged transversely across said chamber and forming the forward wall of a rear baking compartment, groups of straight steam tubes projecting in tiers rearwardly from the fire box into said baking compartment, a plurality of hearth plates, and endless conveyor means for advancing said plates in continuous procession upwardly past the feeding aperture and then downwardly and successively around said tiers of tubes; the top and bottom of the fire box being spaced from the top and bottom of the chamber by amounts just sufficient to provide entrance and exit passageways for said plates.

8. In a baking oven, a substantially rectangular chamber with a feeding aperture in its front wall, a fire box arranged transversely across said chamber and forming the forward wall of a rear baking compartment, groups of straight steam tubes projecting in tiers rearwardly from the fire box into said baking compartment, a plurality of hearth plates, and endless conveyor means for advancing said plates in continuous procession past the feeding aperture and successively around said tiers of tubes; the fire box being provided with opposed fuel nozzles adapted to project flames into the fire box in directions substantially perpendicular to the axes of said tubes.

9. In a baking oven, a substantially rectangular chamber with a feeding aperture in its front wall, a fire box arranged transversely across said chamber and forming the forward wall of a rear baking compartment, groups of straight steam tubes projecting in tiers rearwardly from the fire box into said baking compartment, a plurality of hearth plates, and endless conveyor means for advancing said plates in continuous procession past the feeding aperture and successively around said tiers of tubes; the fire box being provided with opposed fuel nozzles adapted to project flames into the fire box in directions substantially perpendicular to the axes of said tubes, said nozzles being arranged in mutually offset relation to avoid head-on impingement of the opposing flames.

10. In a baking oven, a substantially rectangular chamber with a feeding aperture in its front wall, a fire box arranged transversely across said chamber and forming the forward wall of a rear baking compartment, groups of straight steam tubes projecting in tiers rearwardly from the fire box into said baking compartment, a plurality of hearth plates, endless conveyor means for advancing said plates in continuous procession upwardly past the feeding aperture and then in a downward sinuous path successively around said tiers of tubes, an auxiliary heating unit beneath the lowest plane of plate travel, and means for continuously directing some of the hot gases from the fire box through said auxiliary unit.

CHARLES GOTTFRIED.